Sept. 11, 1962 G. NONNENMACHER 3,053,192
BEARING ARRANGEMENT FOR A HYDRAULIC MACHINE
Filed Feb. 28, 1961
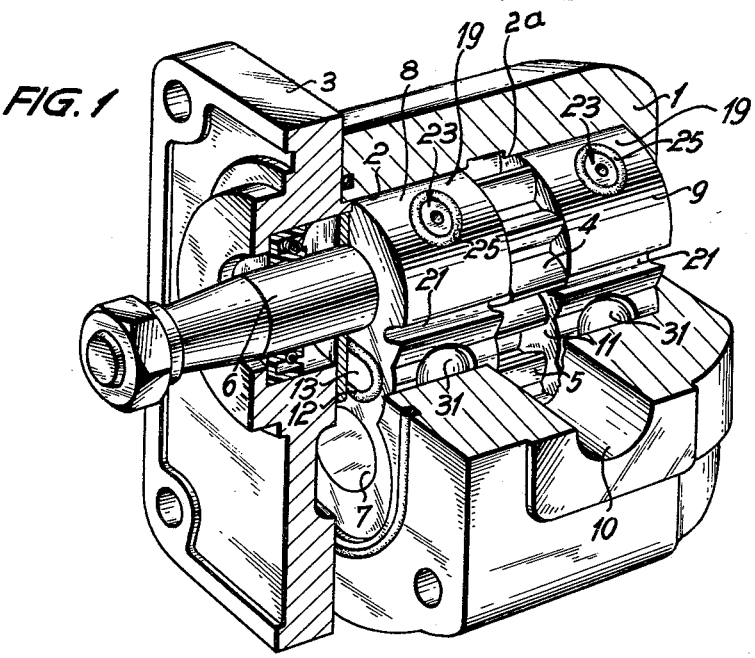
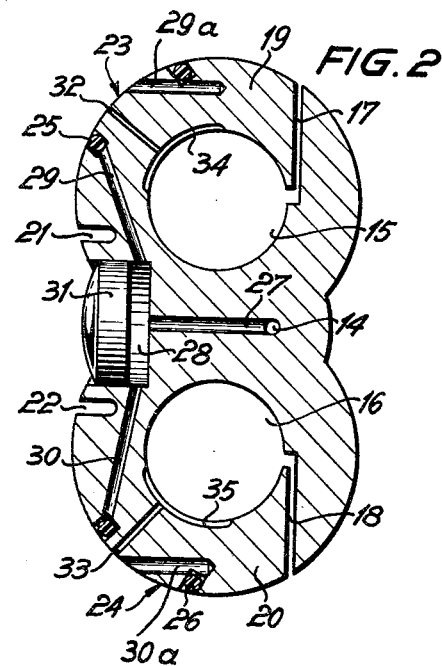
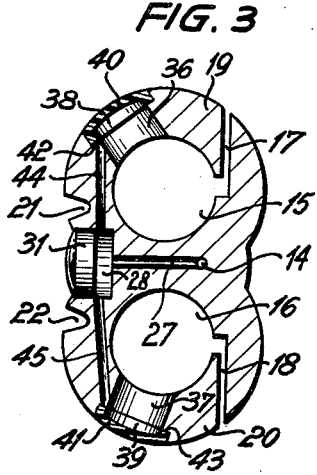
INVENTOR
Gerhard Nonnenmacher
by Michael S. Striker
Attorney United States Patent Office 3,053,192
Patented Sept. 11, 1962

3,053,192
BEARING ARRANGEMENT FOR A
HYDRAULIC MACHINE
Gerhard Nonnenmacher, Korntal, Germany, assignor to Robert Bosch G.m.b.H., Stuttgart, Germany
Filed Feb. 28, 1961, Ser. No. 92,383
Claims priority, application Germany Mar. 1, 1960
15 Claims. (Cl. 103—126)

The present invention relates to a bearing arrangement for a hydraulic machine and more particularly to a hydraulic pump or motor of the type in which two meshing gears form a high-pressure chamber and a low-pressure chamber in a housing.

Since the high-pressure chamber produces a higher pressure on the meshing gears than the low-pressure chamber, the gears, and the shafts thereof, are displaced in a transverse direction, and it is known to provide the bearings of hydraulic machines of this type with displaceable bearing portions which are subjected to fluid pressure to urge the shafts, and thereby the gears against the pressure of the high-pressure chamber into a desired position in which the teeth of the meshing gears slide on the inner surfaces of the casing in the region of the high-pressure chamber to prevent losses.

However, hydraulic machines of this type have the disadvantage that under certain operational conditions, very high friction is developed between the shafts and the bearing. Particularly, if the hydraulic machine is used as a motor, the pressure of the liquid supplied to the high-pressure chamber is directly transmitted to the pressure means which urge the displaceable bearing portions against the shaft before a lubricating film can be formed on the same, so that the gears have to overcome very high friction at the start of the operation.

It is one object of the present invention to overcome the disadvantages of known hydraulic machines of this type, and to provide a bearing arrangement for a hydraulic machine which assures sufficient lubrication of the bearings and shafts under all operational conditions.

Another object of the present invention is to provide in a hydraulic machine of this type, a pressure area between a bearing surface and a shaft, and to establish communication between the high-pressure chamber and the pressure area so that the pressure between the shaft and the bearing surface is reduced.

Another object of the present invention is to provide a hydraulic motor in which a lubricating film is formed between the bearings and the shafts by a liquid supplied under pressure to the inlet of the motor.

With these objects in view, the present invention relates to a hydraulic machine which comprises a housing, a pair of meshing gears having shafts and forming a high-pressure chamber and a low pressure chamber in the housing, and bearing means in the housing for supporting the shafts and having a displaceable bearing portion. The bearing means includes pressure means on the outer surface of the bearing portion, for example, a pressure field communicating with the high pressure chamber. The bearing portion has a pressure area on its bearing surface and is formed with a passage in communication with the high pressure chamber.

The pressure differential between the high pressure chamber and the low-pressure chamber urges the gears and shafts in a direction transverse to the axes thereof away from the high pressure chamber, and the pressure field on the outer surface of each bearing portion urges the bearing portion against the respective shaft so that the same is held in its proper position against the pressure of the high pressure chamber. High friction tends to develop between the inner bearing surface of the bearing portion and the shaft, but the fluid pressure of the pressure area on the bearing surface reduces the pressure between the shaft and the bearing surface so that a lubricating film can be formed on the shaft by liquid passing from the high pressure chamber to the pressure area on the bearing surface of the displaceable bearing portion.

In one embodiment of the invention, the pressure area is formed by a recessed surface portion which is supplied with a liquid through a narrow throttling passage. In another embodiment of the present invention, a wide passage opens on the bearing surface of the displaceable bearing portion in a port which forms the pressure area. The other end of the wide passage is closed by a resilient closure which, under the pressure prevailing in the passage, is urged against the inner surface of the housing whereby the displaceable bearing portion is displaced to hold the shaft in the desired position.

The pressure fields are advantageously sealed by annular sealing rings mounted in recesses of the outer surface of the displaceable bearing portion. In one embodiment of the invention, pressure fluid is supplied to the recess so that the sealing ring is urged against the inner surface of the casing, while another passage connects the recess with the center of the pressure field.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view, partly in section, illustrating a hydraulic machine according to the present invention;

FIG. 2 is a cross-sectional view of a bearing body according to the present invention; and FIG. 3 is a cross-sectional view illustrating a bearing body according to a modified embodiment of the invention.

Referring now to the drawings, the hydraulic machine, for example a hydraulic motor, has a housing 1 with a hollow interior 2 having a cross-section matching the outline of bearing bodies 8 and 9 which may be constructed as shown in FIG. 2 or FIG. 3. Two meshing gears 4 and 5 are located between the bearing bodies 8 and 9 and communicate with an opening 10 through which liquid is discharged if the hydraulic machine is used as a motor. A corresponding opening for a liquid under pressure is provided on the other side of the housing, and communicates with a high-pressure chamber formed by the meshing gears in the housing, such high-pressure chamber corresponding in shape to the low-pressure chamber 11 which is located adjacent the opening 10. The gears have shaft portions 6 and 7, respectively projecting in opposite directions from the gears into the bearing bores 15 and 16 of the bearing bodies 8 and 9. One of the shafts 6 is extended to project out of the housing to be connected to a driven apparatus, if the machine serves as a motor, or to be connected to a prime mover, if the machine serves as a pump. An end plate 3 on housing 1 closes the same fluid-tight, suitable sealing being provided for sealing the bore through which the shaft 6 passes.

Assuming that the machine is operated as a motor, it will be understood by those skilled in the art that the liquid admitted through the high-pressure chamber in the bight between gears 4 and 5 will effect turning movement of the meshing gears while being transported between the gear teeth to the low-pressure chamber 11 to be finally discharged through the outlet 10.

Each bearing body 8 and 9 has an inner face abutting the lateral faces of the gears 4 and 5, and an outer face formed with a pressure field 13 surrounded by a sealing means 12 of annular shape. Passages 14 pass in axial direction through the bearing bodies and connect the pressure fields 12 with the pressure chamber formed by the meshing gears adjacent the inlet of housing 1. Due to the pressure of the pressure fields 13, the bearing bodies 8 and 9 are urged toward each other and into sealing contact with gears 4 and 5.

Referring first to the embodiment of FIG. 2, the bearing body has a central passage 27 connecting passage 14 with a chamber 28 which is closed by a plug 31. Chamber 28 is connected by passages 29 and 30 to a pair of circular recesses in which sealing rings 25 are mounted. Bores 29a and 30a connect the recesses with the areas on the surface of the bearing bodies which are surrounded by sealing rings 25 and 26. Since the pressure of the pressure chamber adjacent the inlet of the motor is transmitted by the liquid through passages 14, 27, chamber 28, passage 29 and 29a to the area surrounded by the sealing rings 25 and 26, pressure fields are created which act between the inner surface of the housing 1 and bearing portions 19 and 20 defined by slots 17, 21 and 18, 22.

Since only a thin portion remains between slots 21, 22 and bearing bores 15 and 16, portions 19 and 20 are resiliently displaceable under the fluid pressure acting on the pressure fields 23 and 24.

The inner bearing surfaces of bearing portions 19 and 20 have recessed surface portions 34 and 35 which are connected by passages 32 and 33 to the center portions of the pressure fields 23 and 24. Since liquid under pressure passes through passages 32 and 33 to the recessed surface portions 34 and 35, pressure areas are created in the recessed surface portions 34 and 35 so that fluid pressure is exerted on the shafts in bearing bores 15 and 16.

The pressure areas 34 and 35 are so arranged, constructed and dimensioned that the fluid pressure therein exerts on the shaft a force smaller than the force by which the shafts are pressed against the displaceable bearing portions 19 and 20 by the fluid in the high-pressure chamber which acts on the gears, and thereby on the shafts. Consequently, the shafts are in sliding engagement with the inner bearing surfaces of the displaceable bearing portions 19 and 20.

During operation of the hydraulic machine as a motor, a liquid under pressure is introduced into the pressure chamber through an inlet, not visible in FIG. 1, and the pressure of the liquid will urge portions of the gears 4 and 5 against the inner surface 2a of the housing. Since at the start of the motor there is no liquid yet in the spaces between the teeth of the gears, very high friction would develop between the gears and the surface 2a. However, the pressure fluid in the pressure chamber passes through the passages 14, 27, 28, 29, and 29a to the pressure fields 23 and 24 so that the displaceable portions 19 and 20 are pressed in radial inward direction to press against the shaft in a direction which is opposite to the direction in which the gears 4 and 5 are pressed by the fluid in the pressure chamber. Consequently, the gear teeth slidably engage the inner surface 2a of the housing adjacent the pressure chamber.

A substantial pressure develops between the inner surfaces of the bearing portions 19 and 20 and the shafts. However, liquid under pressure passes through the passages 32 and 33 from the pressure fields 23 and 24 to the pressure areas 34 and 35 so that the fluid pressure between the bearing surfaces of bearing portions 19 and 20 and the shafts is sufficiently high to eliminate any friction between the surfaces.

The mechanical friction is substantially reduced, and the liquid spreads from pressure areas 34 and 35 around the shafts so that the pressure fluid in the high-pressure chamber has only a small resistance to overcome. Consequently, the motor can be started even under a load torque acting on a projecting portion of shaft 6.

The fluid pressure exerted by the pressure areas 34 and 35 on the shafts, and thereby on the gears, must be smaller than the pressure exerted by the high pressure chamber on the gears, and thereby on the shafts so that the shafts remain in contact with the bearing surfaces of the displaceable bearing portions 19 and 20.

The projecting plug 31 on the low-pressure side of the bearing body supports the same on the inner surface of the housing in the event that liquid under pressure passes from the high-pressure chamber between the inner surface of the housing and the outer surface of the respective bearing body. In this manner, all forces acting on the bearing bodies are substantially balanced.

In the event that the pressure of the pressure areas 34 and 35 exceeds the bearing pressure acting in opposite direction, the shafts will have a tendency to move away from the bearing surfaces of the bearing portions 19 and 20. This may occur if due to unusual operational conditions, the fluid pressure of the supplied liquid substantially fluctuates. In this event, the pressure of the pressure areas 34 and 35 drops rapidly, since passages 32 and 33 are very narrow and act as throttles, permitting the shafts to return to the desired position sliding on the bearing surfaces of bearing portions 19 and 20. In this manner, liquid losses which would reduce the efficiency of the machine, are prevented.

It is, however, not absolutely necessary to provide throttling ducts for supplying pressure liquid to the pressure areas. In the modified embodiment of FIG. 3, the bearing bodies are again provided with bearing bores 15 and 16, and have resiliently displaceable bearing portions 19 and 20. The pressure areas on the bearing surfaces of bearing portions 19 and 20 are constituted by the ports of wide cylindrical passages 36 and 37 whose outer ends 38 and 39 are stepped and of greater diameter to cover an area corresponding to the pressure fields 23 and 24 in the embodiment of FIG. 2. Passages 36 and 37 are closed by the resilient closure means in the form of resilient caps 40 and 41 whose inner flanges are seated on the shoulders 42 and 43. Passages 44 and 45 open into the passages 36 and 37 and communicate through chamber 28 with the pressure chamber of the machine, so that the resilient caps 40 and 41 are pressed by the fluid pressure against the inner surface of the housing to urge the bearing portions 19 and 20 inwardly in radial direction, in the same manner in which the bearing portions are inwardly urged by the pressure fields 23 and 24 in the embodiment of FIG. 2.

The bearing body shown in FIG. 3 can be adapted to correspond to the embodiment of FIG. 2. It is only necessary to remove the caps 40 and 41, to place sealing rings on the shoulders 42 and 43, and to secure inserts in passages 36 and 37, such inserts being formed with narrow throttling passages corresponding to passages 32 and 33.

In the event that the machine is used as a pump, opening 10 is no longer an outlet, but serves as an inlet. The pressure conditions remain the same, since the chamber 11 of a pump adjacent the inlet is the low-pressure chamber, while the chamber on the other side is the high-pressure chamber through which the liquid is discharged into the outlet, not shown.

The bearing bodies 8 and 9 have been described to be integral, but it will be understood that each bearing body includes two bearing means for the two shafts, respectively, and that such bearing means are not necessarily integral, but can be connected to each other by suitable means.

It will be understood that each of the elements described above, or two or more together, may also find a useful application in other types of hydraulic pumps or motors differing from the types described above.

While the invention has been illustrated and described as embodied in a bearing arrangement for a hydraulic machine including means for supplying fluid under high-pressure to the bearing surfaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means including pressure means on said outer surface connected with said high pressure chamber so that the pressure of said pressure means sustains said bearing portion and thereby the respective shaft in radial direction against the pressure of said pressure chamber, each bearing means having a pressure area on said bearing surface of said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area.

2. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means having a pressure field on said outer surface connected with said high pressure chamber so that the pressure of said pressure field sustains said bearing portion and thereby the respective shaft in radial direction against the pressure of said pressure chamber, each bearing means having a pressure area on said bearing surface of said bearing portion thereof and being formed with a passage extending between said pressure field and said pressure area, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area.

3. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means including pressure means on said outer surface connected with said high pressure chamber so that the pressure of said pressure means sustains said bearing portion and thereby the respective shaft in radial direction against the pressure of said pressure chamber, each bearing means having a pressure area on said bearing surface of said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said pressure means and said pressure area and passage being constructed and arranged so that the pressure exerted by said pressure area on said shaft is smaller than the pressure exerted by said bearing portion on said shaft under the force of said pressure means.

4. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means having a pressure field on said outer surface connected with said high pressure chamber so that the pressure of said pressure field sustains said bearing portion and thereby the respective shaft in radial direction against the pressure of said pressure chamber, each bearing means having a pressure area on said bearing surface of said bearing portion thereof and being formed with a passage extending between said pressure field and said pressure area, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said pressure field and said pressure area and passage being constructed and arranged so that the pressure exerted by said pressure area on said shaft is smaller than the pressure exerted by said bearing portion on said shaft under the force of said pressure field.

5. In a hydraulic machine, in combination, a housing having a hollow interior and an inlet and an outlet; a pair of meshing gears having shafts with parallel axes and being disposed in said housing to form in said hollow interior a high pressure chamber and a lower pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means having a pressure field on said outer surface connected with said high pressure chamber so that the pressure of said pressure field sustains said bearing portion and thereby the respective shaft in radial direction against the pressure of said pressure chamber, each bearing means having a pressure area on said bearing surface of said bearing portion thereof and being formed with a passage extending between said pressure field and said pressure area, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said passage having a selected small cross section to throttle the flow of a liquid therethrough, said pressure field and said pressure area and passage being constructed and arranged so that the pressure exerted by said pressure area on said shaft is smaller than the pressure exerted by said bearing portion on said shaft under the force of said pressure field.

6. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means including pressure means on said outer surface connected with said high pressure chamber so that the pressure of said pressure means sustains said bearing portion and thereby the respective shaft in radial direction against the pressure of said pressure chamber, each bearing means having a pressure area on said bearing surface of said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said passage opening on said bearing surface in a port constituting said pressure area.

7. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means including pressure means on said outer surface connected with said high pressure chamber so that the pressure of said pressure means sustains said bearing portion and thereby the respective shaft in radial direction against the pressure of said pressure chamber, each bearing means having a pressure area on said bearing surface of said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said passage opening on said bearing surface in a port constituting said pressure area, said pressure means being a resilient closure member located in said passage in the region of said outer surface and being urged by the pressure in said passage against said housing.

8. A hydraulic machine as set forth in claim 7 wherein each passage is stepped and has an inner passage portion of smaller diameter having said port at the inner end thereof, and an outer passage portion of greater diameter in the region of said outer surface; and wherein said resilient closure member is a resilient cap seated in said outer passage portion and having an outer surface flush with said outer surface of said bearing portion.

9. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; a pair of bearing bodies located in said housing on opposite sides of said meshing gears, each bearing body having two bearing means for respectively supporting the ends of both said first and second shafts, each bearing means being formed with slots defining thereon a bearing portion resiliently displaceable substantially in said transverse direction, each bearing portion having an outer peripheral surface located in said interior of said housing, and an inner bearing surface for rotatably supporting the respective shaft, each bearing means including pressure means on said outer surface, said bearing bodies being formed with passages for operatively connecting the pressure means thereof with said high pressure chamber so that the pressure of said pressure means sustains said bearing portion and thereby the respective shaft in radial direction against the pressure of said pressure chamber, each bearing means having a pressure area on said bearing surface of said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said pressure means and said pressure area and passage being constructed and arranged so that the pressure exerted by said pressure area on said shaft is smaller than the pressure exerted by said bearing portion on said shaft under the force of said pressure means.

10. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; a pair of bearing bodies located in said housing on opposite sides of said meshing gears, each bearing body having two bearing means for respectively supporting the ends of both said first and second shafts, each bearing body being movable in axial direction along said shafts and having an inner face axially confronting said gears and an outer face axially confronting said housing, each bearing body being formed with conduit means for connecting said high pressure chamber with said outer face thereof so that said bearing bodies are urged inwardly toward said gears until said inner faces abut the same, each bearing means being formed with slots defining thereon a bearing portion resiliently displaceable substantially in said transverse direction, each bearing portion having an outer peripheral surface located in said interior of said housing, and an inner bearing surface for rotatably supporting the respective shaft, each bearing means including pressure means on said outer surface, said bearing bodies being formed with passages for operatively connecting the pressure means thereof with said high pressure chamber so that the pressure of said pressure means sustains said bearing portion and thereby the respective shaft in radial direction against the pressure of said pressure chamber, each bearing means having a pressure area on said bearing surface of said said bearing portion thereof and being formed with a passage in communication with said high pressure chamber, said pressure means and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said pressure means and said pressure area and passage being constructed and arranged so that the pressure exerted by said pressure area on said shaft is smaller than the pressure exerted by said bearing portion on said shaft under the force of said pressure means.

11. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; a pair of bearing bodies located in said housing on opposite sides of said meshing gears, each bearing body having two bearing means for respectively supporting the ends of both said first and second shafts, each bearing body being movable in axial direction along said shafts and having an inner face axially confronting said gears and an outer face axially confronting said housing, each bearing body being formed with conduit means for connecting said high pressure chamber with said outer face thereof so that said bearing bodies are urged inwardly toward said gears until said inner faces abut the same, each bearing means being formed with slots defining thereon a bearing portion resiliently displaceable substantially in said transverse direction, each bearing portion having an outer peripheral surface located in said interior of said housing, and an inner bearing surface for rotatably supporting the respective shaft, each bearing means having a pressure field on said outer surface, and said bearing bodies being formed with passages for operatively connecting the pressure field thereof with said high pressure chamber so that the pressure of said pressure field sustains said bearing portion and thereby the respective shaft in radial direction against the pressure of said pressure chamber, each bearing means having a pressure area on said bearing surface of said bearing portion thereof and being formed with a passage extending between said pressure field and said pressure area, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area, said pressure field and said pressure area and passage being constructed and arranged so that the pressure exerted by said pressure area on said shaft is smaller than the pressure exerted by said bearing portion on said shaft under the force of said pressure field.

12. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, each bearing means having a bearing portion displaceable substantially in said transverse direction and having an outer peripheral surface confronting the inner surface of said housing and an inner bearing surface for rotatably supporting the respective shaft, each bearing means including an annular sealing ring on said outer surface and being formed with a passage means communicating with said high pressure chamber and with the space surrounded by said sealing ring so that a pressure field surrounded by said sealing ring is created between the inner surface of said housing and said outer surface of said bearing means, said pressure field being constructed and arranged so that the pressure thereof sustains said bearing portion and thereby the respective shaft in radial direction against the pressure of said pressure chamber, each bearing means having a pressure area on said bearing surface of said bearing portion thereof and being formed with a passage extending between said pressure field and said pressure area so that said pressure area exerts a force in said transverse direction on said shaft, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area.

13. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, each bearing means having a bearing portion displaceable substantially in said transverse direction and having an outer peripheral surface confronting the inner surface of said housing and an inner bearing surface for rotatably supporting the respective shaft, each bearing means having an annular recess in said outer surface, and including an annular sealing ring in said annular recess, each bearing means being formed with a passage connecting said high pressure chamber with said recess and with another passage connecting said recess with the space surrounded by said sealing ring so that said sealing ring is pressed against the inner surface of said housing and a pressure field surrounded by said sealing ring is created between the inner surface of said housing and said outer surface of said bearing means, said pressure field being constructed and arranged so that the pressure thereof sustains said bearing portion and thereby the respective shaft in radial direction against the pressure of said pressure chamber, each bearing means having a pressure area on said bearing surface of said bearing portion thereof and being formed with a passage extending between said pressure field and said pressure area so that said pressure area exerts a force in said transverse direction on said shaft, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area.

14. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, respectively, each bearing means having a bearing portion displaceable substantially in said transverse direction and having an outer peripheral surface located in said interior of said housing, and an inner bearing surface for rotatably supporting the respective shaft, each bearing means having a pressure field on said outer surface connected with said high pressure chamber so that the pressure of said pressure field sustains said bearing portion and thereby the respective shaft in radial direction against the pressure of said pressure chamber, each bearing means having a recessed surface on said bearing surface of said bearing portion thereof and being formed with a passage connecting said pressure field with said recessed surface so that the latter constitutes a pressure area exerting a force in said transverse direction against the respective shaft, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area in radial direction, said passage having a selected small cross section to throttle the flow of a liquid therethrough, said pressure field and said pressure area and passage being constructed and arranged so that the pressure exerted by said pressure area on said shaft is smaller than the pressure exerted by said bearing portion on said shaft under the force of said pressure field.

15. In a hydraulic machine, in combination, a housing having a hollow interior and an inlet and an outlet; a pair of meshing gears having shafts with parallel axes and being disposed in said housing to form in said hollow interior a high pressure chamber and a low pressure chamber whereby said gears and shafts are urged in a direction transverse to said axes away from said high pressure chamber; first and second bearing means located in said housing on opposite sides of said gears for supporting the ends of both said shafts, each bearing means having a bearing portion displaceable substantially in said transverse direction and having an outer peripheral surface confronting the inner surface of said housing and an inner bearing surface for rotatably supporting the respective shaft, each bearing means having an annular recess in said outer surface, and including an annular sealing ring in said annular recess, each bearing means being formed with a passage connecting said high pressure chamber with said recess and with another passage connecting said recess with the space surrounded by said sealing ring so that said sealing ring is pressed against the inner surface of said housing and a pressure field surrounded by said sealing ring is created between the inner surface of said housing and said outer surface of said bearing means, said pressure field being constructed and arranged so that the pressure thereof sustains said bearing portion and thereby the respective shaft in radial direction against the pressure of said pressure chamber, each bearing means having a recessed surface portion on said bearing surface of said bearing portion thereof and being formed with a narrow throttling passage extending between said pressure field and said recessed surface portion so that the same constitutes a pressure area exerting a force in said transverse direction on said shaft, said pressure fields and pressure areas being located substantially diametrically opposite to said high pressure chamber so that the effect of the pressure on the outer surface of the bearing means to counteract the force of the pressure in the high pressure chamber on said shafts is reduced by the high pressure acting in said pressure area.

References Cited in the file of this patent

UNITED STATES PATENTS

| | | |
|---|---|---|
| 1,379,587 | Fisher | May 24, 1921 |
| 2,236,980 | Ungar | Apr. 1, 1941 |
| 2,319,374 | Ungar | May 18, 1943 |
| 2,714,856 | Kane | Aug. 9, 1955 |
| 2,728,301 | Lindberg | Dec. 27, 1955 |
| 2,746,394 | Dolza et al. | May 22, 1956 |
| 2,870,719 | Murray et al. | Jan. 27, 1959 |
| 2,891,483 | Murray et al. | June 23, 1959 |
| 2,993,450 | Weigert | July 25, 1961 |

FOREIGN PATENTS

| | | |
|---|---|---|
| 782,701 | Great Britain | Sept. 11, 1957 |
| 853,547 | Great Britain | Nov. 9, 1960 |
| 1,006,722 | Germany | Apr. 18, 1957 |